US012589718B2

(12) United States Patent　　(10) Patent No.: US 12,589,718 B2
Conrad　　(45) Date of Patent: Mar. 31, 2026

(54) DEVICE AND METHOD FOR APPLYING A CLEANING LIQUID TO A VEHICLE PART

(71) Applicant: WashTec Holding GmbH, Augsburg (DE)

(72) Inventor: Ferdinand Conrad, Augsburg (DE)

(73) Assignee: WashTec Holding GmbH, Augsburg (DE)

( * ) Notice: Subject to any disclaimer, the term of this patent is extended or adjusted under 35 U.S.C. 154(b) by 519 days.

(21) Appl. No.: 17/795,945

(22) PCT Filed: Jan. 18, 2021

(86) PCT No.: PCT/EP2021/050905
§ 371 (c)(1),
(2) Date: Jul. 28, 2022

(87) PCT Pub. No.: WO2021/151698
PCT Pub. Date: Aug. 5, 2021

(65) Prior Publication Data
US 2023/0119948 A1　　Apr. 20, 2023

(30) Foreign Application Priority Data

Jan. 30, 2020　(DE) ..................... 10 2020 102 289.1

(51) Int. Cl.
*B60S 3/04*　　(2006.01)
*B05B 1/00*　　(2006.01)
*B05B 13/02*　　(2006.01)
(52) U.S. Cl.
CPC ............... *B60S 3/042* (2013.01); *B05B 1/00* (2013.01); *B60S 3/04* (2013.01); *B05B 13/0285* (2013.01)
(58) Field of Classification Search
CPC ...................................... B60S 3/042
See application file for complete search history.

(56) References Cited

U.S. PATENT DOCUMENTS 3,670,743 A * 6/1972 Moore .................... B60S 3/042
134/45
3,758,906 A * 9/1973 Takeuchi ................ B60S 3/042
15/53.2
(Continued)

FOREIGN PATENT DOCUMENTS

CN　　108749777 A * 11/2018
DE　　3518297 A1　 11/1986
(Continued)

OTHER PUBLICATIONS

CN108749777A Machine Translation (Year: 2018).*
(Continued)

*Primary Examiner* — Spencer E. Bell
(74) *Attorney, Agent, or Firm* — Fleit Intellectual Property Law; Paul D. Bianco; Katharine Davis Wong

(57)　　　　ABSTRACT

A device for applying a cleaning liquid to a vehicle part includes an upper nozzle for discharging cleaning liquid in a first spray geometry delimited in a first vertical cross-section starting from the upper nozzle, by a first upper side piece and a first lower side piece that enclose a first opening angle with one another. The device also includes a lower nozzle for discharging cleaning liquid in a second spray geometry delimited in a second vertical cross-section starting from the upper nozzle, by a second upper side piece and a second lower side piece that enclose a second opening angle with one another. In a vertical projection, a first straight line extending through the first upper side piece encloses an angle with a second straight line extending through the second lower side piece is less than 10°, and the first lower side piece intersects the second upper side piece in the discharge direction.

13 Claims, 2 Drawing Sheets

(56) References Cited

U.S. PATENT DOCUMENTS

| | | | | | |
|---|---|---|---|---|---|
| 4,971,084 | A | * | 11/1990 | Smith | B60S 3/042 |
| | | | | | 239/560 |
| 7,243,665 | B1 | * | 7/2007 | Turner | B60S 3/042 |
| | | | | | 134/123 |
| 9,469,278 | B2 | | 10/2016 | Wimmer | |
| 2014/0170324 | A1 | * | 6/2014 | Kohonen | B05B 1/00 |
| | | | | | 118/301 |

FOREIGN PATENT DOCUMENTS

| | | | | | |
|---|---|---|---|---|---|
| DE | 3802409 | A1 | 8/1989 | | |
| DE | 9000427 | U1 | 3/1991 | | |
| JP | H0516529 | U | 3/1993 | | |
| JP | 2000-317412 | A | 11/2000 | | |
| WO | 2012/028346 | A1 | 3/2012 | | |
| WO | WO-2017156524 | A1 | * 9/2017 | | A46B 13/001 |

OTHER PUBLICATIONS

Written Opinion dated Apr. 7, 2021, for PCT/EP2021/050905, filed Jan. 18, 2021.

International Search Report dated Apr. 7, 2021, for PCT/EP2021/050905 filed Jan. 18, 2021.

Written Opinion for PCT/EP2021/050905 filed Jan. 18, 2021.

International Preliminary Report on Patentability dated Nov. 30, 2021 for PCT/EP2021/050905, filed Jan. 18, 2021 (English translation).

Second Office Action dated May 23, 2025 for Chinese Patent Application No. 2021800121752.

* cited by examiner

DEVICE AND METHOD FOR APPLYING A CLEANING LIQUID TO A VEHICLE PART

FIELD OF THE INVENTION

The present invention relates to a device for applying a cleaning liquid to a vehicle part. The device comprises an upper nozzle for discharging cleaning liquid in a first spray geometry. The first spray geometry is delimited, in a first vertical cross-section starting from the upper nozzle, by a first upper side piece and a first lower side piece that enclose a first opening angle with one another. The invention further relates to a method for applying a cleaning liquid to a vehicle part and a vehicle washing installation with such a device. The device and the method are particularly designed to apply cleaning liquid to a vehicle rim.

BACKGROUND

A wheel washing device is known from DE 90 00 427 U1, which is particularly suitable for wheels of trucks. Optimum washing results should be achieved in particular for different wheel shapes. This is achieved by the wheel washing device having a cover which surrounds a washing head. This cover consists of an elastic material. The cover is positioned against the vehicle wheel for the washing process so that a substantially closed washing space is formed around the washing head. The cover prevents cleaning liquid from reaching the vehicle body. A central nozzle is used to apply the cleaning liquid. A rotating ring nozzle is used to apply rinsing liquid.

A rim cleaning device for car wash installations is known from DE 35 18 297 C2. With this rim cleaning device, cleaning liquid is sprayed onto the vehicle rim by means of a fixed spray nozzle. A washing brush is subsequently fed to the rim, by means of which the vehicle rim is cleaned. The spray geometry of the discharged cleaning liquid has, in a vertical cross-section in which the axis of the rim and the nozzle are situated, an upper side piece which, starting from the nozzle, is directed diagonally upwards towards the upper part of the vehicle rim, and a lower side piece which is directed diagonally downwards towards the lower part of the vehicle rim.

With vehicle washing installations, the problem arises that the horizontal distance of the nozzle from the vehicle rim may vary in the transverse direction of the vehicle. This horizontal distance of the vehicle rim from the nozzle is usually smaller for vehicles with a large track width than for vehicles with a smaller track width. At the same time, vehicles with a large track width usually have a larger rim diameter than vehicles with a smaller track width. This results in large vehicle rims having a smaller horizontal distance from the nozzle than smaller vehicle rims in a vehicle washing installation.

Since the spray geometry of the nozzle has side pieces in the vertical cross-section that enclose an opening angle, the sprayed area is smaller when the vehicle rim is located horizontally closer to the nozzle and larger when the vehicle rim is located horizontally further away from the nozzle. In a vehicle washing installation, the result of this is that, in the case of large vehicle rims, which in themselves have a larger area to be cleaned, the spray jet is applied to a smaller area and a smaller vehicle rim, which in itself has a smaller area to be cleaned, the spray jet is applied to a larger area with cleaning liquid. Depending on the opening angle of the spray geometry, this results in either the large vehicle rim not being completely sprayed with cleaning liquid or cleaning liquid being sprayed past the smaller vehicle rim. Both scenarios are disadvantageous.

To solve this problem, WO 2012/028346 A1 proposes a device and a method for applying cleaning liquid to a wheel of a vehicle, in which the spray nozzle is arranged on a moveable feed device for movement between a resting position remote from the wheel and a spray position at a spraying distance remote from the wheel. Here, the spray nozzle is moved in particular so as to assume a specific desired spraying distance from the wheel. To determine the desired spraying distance, the distance of the wheel to the device is determined and then the spray nozzle moves the spraying position at which it has the desired spraying distance from the wheel. Cleaning liquid is subsequently sprayed onto the wheel with the spray nozzle while the spray nozzle is moved along the wheel in the direction of washing.

What is disadvantageous about this device and method is that an adjustable spray nozzle requires a complex and thus more expensive and high-maintenance device construction. Furthermore, in this case it is necessary to determine the distance of the wheel or vehicle rim from the spray nozzle and to control a feed device depending on this distance in the horizontal direction. This also results in higher costs in the manufacture and maintenance of the device.

SUMMARY OF THE INVENTION

The present invention therefore relates to a device and a method of the type mentioned at the start, with which cleaning liquid can be applied to a vehicle part, in particular a vehicle rim or a vehicle wheel, in such a way that the cleaning liquid can be applied to the vehicle part regardless of the horizontal distance of the vehicle part from the nozzle. Here, as much cleaning liquid as possible should be applied to the vehicle part, and the amount of cleaning liquid that does not reach the vehicle should be as small as possible.

Advantageous embodiments and developments are also disclosed herein.

The device according to the invention comprises, in addition to the upper nozzle, a lower nozzle for discharging cleaning liquid in a second spray geometry which, starting from the lower nozzle, is delimited in a second vertical cross-section by a second upper side piece and a second lower side piece, which enclose a second opening angle with one another. Here, the upper nozzle is spaced above the lower nozzle in the vertical direction. Furthermore, in a vertical projection, a first straight line extending through the first upper side piece encloses an angle with a second straight line extending through the second lower side piece that is less than 10 degrees, and the first lower side piece intersects the second upper side piece in the discharge direction of the cleaning liquid.

Here, the vertical cross-section in particular defines a plane in which a discharge opening of the upper or lower nozzle is located, and in which discharged liquid volumes of this nozzle move. In the nozzle, the direction and speed are defined with which the individual liquid volumes are discharged. These parameters depend on the geometry of the nozzle as well as the pressure of the cleaning liquid at the nozzle. The spray geometry defines which areas discharged liquid volumes reach, or through which areas discharged liquid volumes move. If the liquid volumes come into contact with a surface to be cleaned, the result is a sprayed surface, which results from the spray geometry and the arrangement of the surface to be cleaned relative to the nozzle.

In the vertical cross-section, the spray geometry is determined by two side pieces that enclose an opening angle. It is assumed as an approximation that the side pieces are straight. However, due to gravity, the side pieces are actually bent slightly downwards. The bending depends on the discharge speed of the liquid volumes and the properties of the cleaning liquid. As an approximation, it can be assumed that the orientation of the side pieces, which are considered to be approximately straight, coincides with the tangent of the actually slightly bent side piece at the outlet opening of the nozzle.

The upper nozzle is arranged above the lower nozzle. If the upper nozzle has no horizontal offset perpendicular to the vertical cross-section relative to the lower nozzle, i.e. if the upper nozzle is arranged directly above the lower nozzle in this horizontal direction, the first vertical cross-section coincides with the second vertical cross-section. Only if the upper nozzle in this horizontal direction is horizontally offset to the lower nozzle, is the first vertical cross-section parallel to the second vertical cross-section, but horizontally offset to it. Such an offset is irrelevant in the aforementioned vertical projection. If the upper nozzle is located directly above the lower nozzle, and thus the first and the second vertical cross-sections coincide, the vertical projection is equal to the first and second vertical cross-sections respectively.

Since, in the device according to the invention, the first upper side piece is substantially parallel to the second lower side piece, a liquid volume moving along the first upper side piece does not encounter a liquid volume moving along the second lower side piece. The first upper side piece thus only intersects with the second lower side piece in an intended extension either in the discharge direction of the cleaning liquid or against the discharge direction of the cleaning liquid, depending on the angle of the respective side piece to the horizontal. If the first and second straight lines intersect in the discharge direction of the cleaning liquid, the liquid volumes on these side pieces move vertically towards one another. If the first and second straight lines intersect in the opposite direction to the discharge direction of the cleaning liquid, the liquid volumes on these side pieces move away from one another in the vertical direction. If the first upper side piece and the second lower side piece run parallel, the vertical distance of liquid volumes discharged on these side pieces does not change.

The angle enclosed by the first and second straight lines is in particular less than 5 degrees, preferably less than 3 degrees. Particularly preferably, the angle is 0 degrees. In this case, the first and second straight lines and thus the first upper side piece and the second lower side piece run parallel to one another.

A liquid volume moving along the first lower side piece encounters a liquid volume moving along the second upper side piece. The horizontal distance of the point of intersection of the first lower side piece with the second upper side piece depends on the opening angles of the first and second spray geometries.

The device according to the invention has the advantage that, due to the arrangement of the lower and upper nozzles and due to the spray geometries of these nozzles, at a horizontal distance from the nozzles an area is formed in which cleaning liquid can be applied to a surface of a vehicle part to be cleaned or to the vehicle part in such a way that, when the horizontal distance of the vehicle part from the nozzles is changed in this area, the desired surface of the vehicle part or the vehicle part is completely covered with cleaning liquid, without cleaning liquid being sprayed past this surface or the vehicle part.

In the following, it is assumed that the vehicle part is to be sprayed with cleaning liquid. In the same way, however, it is also possible that not the entire vehicle part but only a specific surface area or specific surface of the vehicle part is to be sprayed with cleaning liquid. The area to be sprayed or the surface thus discussed in this case corresponds to the vehicle part in terms of size and orientation.

According to an embodiment of the device according to the invention, the first and second vertical cross-sections coincide. The nozzles are thus spaced apart in the vertical direction, but not in the horizontal direction, which is perpendicular to the vertical cross-section.

According to another embodiment, the first vertical cross-section may also be arranged at a distance from the second vertical cross-section. Here, the first vertical cross-section is in particular orientated parallel to the second vertical cross-section. In this case, the nozzles are arranged at a distance from one another both in the vertical direction and in the horizontal direction. They are thus arranged horizontally offset to one another.

According to a further embodiment of the device according to the invention, the first upper side piece is horizontally orientated. Alternatively or additionally, the second lower side piece is horizontally orientated. A liquid volume discharged so as to move along the first upper side piece or along the second lower side piece, respectively, thus does not change its height, provided that the change of trajectory due to gravity is neglected. Such a liquid volume thus comes into contact with the vehicle part to be cleaned at the height of the nozzle, regardless of the distance of the vehicle part from this nozzle (provided, again, that change of trajectory due to gravity is neglected).

In a further embodiment of the device according to the invention, the first upper side piece and the second lower side piece are orientated parallel to one another. In this case, between the two side pieces an area is formed in a direction perpendicular to the side pieces, in which the cleaning liquid is applied to a vehicle part regardless of its distance. In the part of this area which is also situated beyond the point of intersection of the first lower side piece with the second upper side piece, the vehicle part to be cleaned is actually completely covered with cleaning liquid.

The first and/or second opening angle is in particular in a range of 30 degrees to 50 degrees, preferably in a range of 35 degrees to 45 degrees. However, the two opening angles do not have to be the same here. An intersection of the first lower side piece with the second upper side piece at a horizontal distance from the nozzles results from these opening angles, which is smaller than the usual horizontal distance of the surface to be cleaned from the nozzles in a vehicle washing installation.

According to a further embodiment of the device according to the invention, the second lower side piece is horizontally orientated and the first upper side piece is inclined downwards by an angle which is in a range of 6 degrees to 10 degrees. In particular, this angle is 8 degrees. If the device is used in a vehicle washing installation in which vehicles with different rim sizes or wheel sizes are cleaned, this embodiment advantageously results in an improved application of cleaning liquid to vehicle rims of different sizes. Due to the horizontal orientation of the second lower side piece, it always approximately intersects the lower edge of the vehicle rim, regardless of the wheel size, provided that the lower nozzle is accordingly vertically arranged. The first upper side piece, on the other hand, comes into contact with the vehicle wheel or rim in a vertical position that depends on the horizontal distance of the vehicle wheel from the nozzles. However, since in a vehicle washing installation smaller vehicle rims are usually arranged horizontally further away from the nozzles than larger vehicle rims, and since the first upper side piece thus comes into contact with smaller vehicle rims further down than with larger vehicle rims, the differences with regard to the size and the horizontal distance of the vehicle rims from the nozzles are advantageously balanced by the inclination of the first upper side piece.

According to an embodiment of the device according to the invention, the nozzles are stationary in relation to the device. The nozzles can thus be moved together with the device. This movement can in particular be a translation in which the nozzles follow a moving vehicle wheel. However, the nozzles do not perform any pivoting or rotating movements.

According to a further embodiment of the device according to the invention, the nozzles are arranged rotatably around an axis which is horizontally orientated. The axis is situated in particular in the vertical cross-section. In particular, the axis intersects the point of intersection of the first lower side piece with the second upper side piece. Advantageously, in this case, a surface can be sprayed with cleaning liquid by means of the nozzles which is circular disc-shaped in the plane perpendicular to the axis. The composite spray geometry in the vertical cross-section or the first and second vertical cross-sections, which is composed of the first spray geometry and the second spray geometry, is in particular mirror-symmetrical in this case. The mirror symmetry plane here is perpendicular to the vertical cross-section or the first and second vertical cross-sections. It furthermore intersects the point of intersection of the first lower side piece with the second upper side piece.

The upper or lower nozzle is in particular a full cone nozzle and/or a flat jet nozzle. Preferably, the upper nozzle and the lower nozzle is a full cone nozzle or the upper nozzle and the lower nozzle is a flat jet nozzle.

This invention further relates to a vehicle washing installation comprising the device described above. In this case, the device is used for cleaning at least one rim of a vehicle to be cleaned. In this case, in particular, the vertical distance of the upper nozzle from the lower nozzle corresponds to the diameter of the rim to be cleaned and the distance of the upper nozzle from the ground corresponds to the distance of the upper edge of the rim from the ground, and the distance of the lower nozzle from the ground corresponds to the distance of the lower edge of the rim from the ground.

In the vertical positioning of the nozzles, a standard diameter or an average diameter of a rim and a wheel can be assumed, so that such an average wheel with such an average rim is completely sprayed with cleaning liquid in a specific horizontal distance range, regardless of the horizontal distance, without cleaning liquid being sprayed past the rim.

In the embodiment of the device according to the invention, in which the second lower side piece is horizontally orientated and the first upper side piece is inclined downwards at an angle, vehicle rims of different sizes can also be completely sprayed with cleaning liquid as described above without cleaning liquid being sprayed past the respective rim.

According to another embodiment, the diameter of the rim and the vertical position of the rim above the ground can be determined, e.g. detected or transmitted in the form of data. Depending on this size and position of the rim, the vertical positions of the nozzles can then be adjusted. In this case, the nozzles can be moved vertically, for example. In this way, rims of different sizes, which are located at different distances from the ground, can be sprayed with cleaning liquid in a specific horizontal range, regardless of the horizontal distance from the nozzles, in such a way that they are completely covered with cleaning liquid without cleaning liquid being sprayed next to the rims.

The invention further relates to a method for applying a cleaning liquid to a vehicle part, in which cleaning liquid is discharged by means of an upper nozzle in a first spray geometry in the direction of the vehicle part to be cleaned, wherein the first spray geometry is delimited in a first vertical cross-section, starting from the upper nozzle, by a first upper side piece and a first lower side piece, which enclose a first opening angle with one another, and by which means cleaning liquid is discharged in a second spray geometry in the direction of the vehicle part to be cleaned by means of a lower nozzle which is vertically spaced apart from the upper nozzle, wherein the second spray geometry is delimited in a second vertical cross-section, starting from the lower nozzle, by a second upper side piece and a second lower side piece which enclose a second opening angle with one another. Here, in a vertical projection, a first straight line extending through the first upper side piece encloses an angle with a second straight line extending through the second lower side piece that is less than 10 degrees, in particular less than 5 degrees, and the first lower side piece intersects the second upper side piece in the discharge direction of the cleaning liquid.

The method according to the invention can in particular be carried out by the device according to the invention. It has the same advantages as the device according to the invention.

According to a development of the method according to the invention, the vertical position of an upper edge of the vehicle part to be cleaned and/or the vertical position of a lower edge of the vehicle part to be cleaned is or are determined, and the vertical position of the upper nozzle is adjusted to correspond to the vertical position of the upper edge of the vehicle part to be cleaned and/or the vertical position of the lower nozzle is adjusted to correspond to the vertical position of the lower edge of the vehicle part to be cleaned. In this way, the vertical position of one nozzle or both nozzles can be adapted to the vertical range of the vehicle part to be cleaned, wherein, however, the horizontal distance of the vehicle part from the nozzles can vary without cleaning liquid being sprayed past the vehicle part or areas of the vehicle part not being covered in cleaning liquid.

According to an embodiment of the method according to the invention, the first lower side piece comes into contact with the vehicle part to be cleaned above the lower edge of the vehicle part to be cleaned. Alternatively or additionally, the second upper side piece comes into contact with the vehicle part to be cleaned, in particular below the upper edge of the vehicle part to be cleaned. Thus, an area is formed on the vehicle part to be cleaned in which only cleaning liquid discharged by the upper nozzle is applied, and an area is formed in which only cleaning liquid discharged by the lower nozzle is applied. In between, an area is formed in which cleaning liquid, which has been discharged from both the upper nozzle and the lower nozzle, is applied. In this way, it is reliably achieved that the vehicle part to be cleaned is completely covered with cleaning liquid, but no cleaning liquid is sprayed past the vehicle part to be cleaned.

If the upper and lower nozzles are arranged offset in a direction perpendicular to the first or second cross-section and the vehicle part moves along this direction relative to the nozzles, the nozzles are controlled in the method according to the invention in particular in such a way that cleaning liquid is discharged via the nozzles with a time delay. Through this, it can be ensured that the relative position of the vehicle part to the nozzle via which cleaning liquid is discharged is always the same in the direction perpendicular to the first or second cross-section. This direction is in particular horizontally orientated in the longitudinal direction, i.e. direction of movement, of a vehicle.

BRIEF DESCRIPTION OF THE DRAWINGS

The invention will now be explained by means of exemplary embodiments with reference to the drawings.

DETAILED DESCRIPTION

Figure 1:
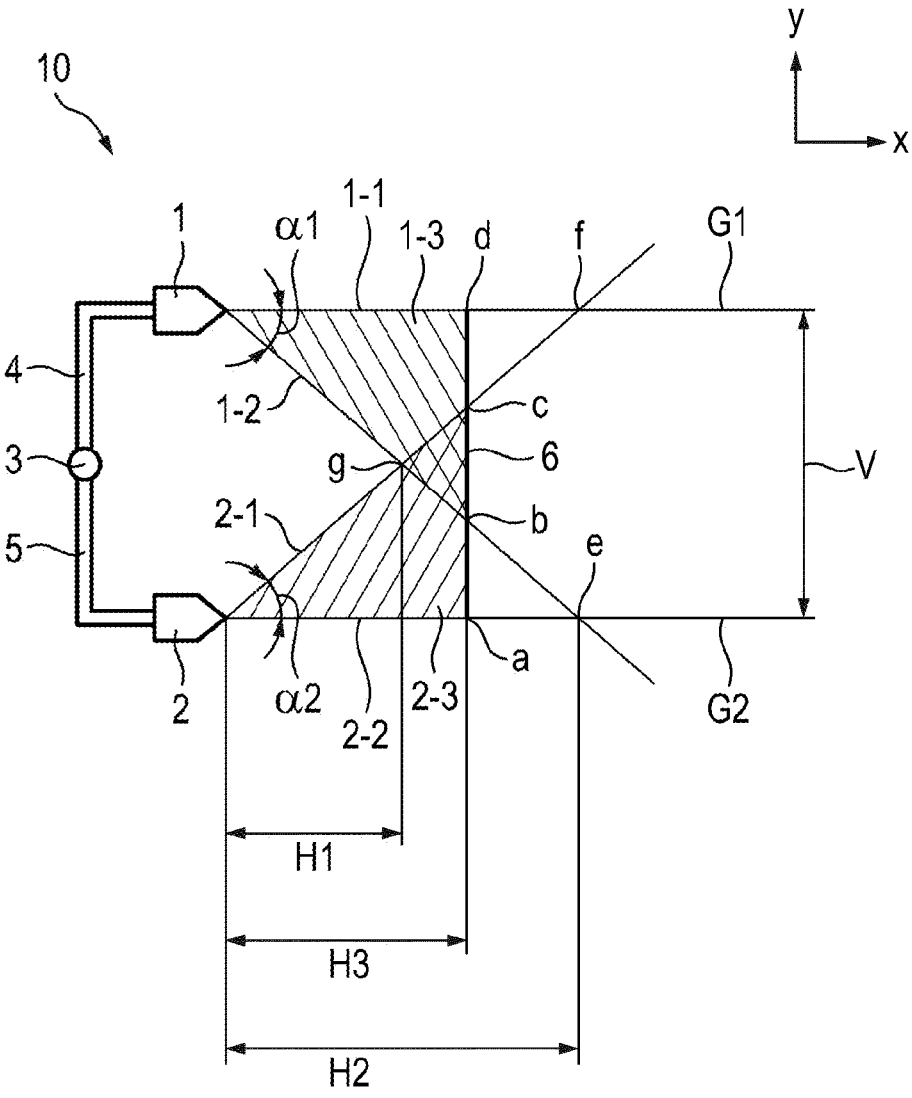
FIG. 1 shows a vertical cross-section of an exemplary embodiment of the device according to the invention, the spray geometry generated by the nozzles and a vehicle part to be cleaned.

With reference to FIG. 1, an exemplary embodiment of the device 10 according to the invention is described:

The device 10 comprises a first nozzle 1 and a second nozzle 2. The nozzles 1 and 2 are flat jet nozzles. In other exemplary embodiments, however, other types of nozzles can also be used. Cleaning liquid is supplied under pressure via a central supply line 3 to the first nozzle 1 via a first supply line 4 and to the second nozzle 2 via a second supply line 5. This cleaning liquid is discharged at the discharge openings of nozzles 1 and 2, in each case with a specific spray geometry.

The first nozzle 1 is arranged at a distance in the vertical direction y above the second nozzle 2. In the exemplary embodiment, the first nozzle 1 is arranged directly above the second nozzle 2. It has no offset in the horizontal direction, i.e. the x-direction and the z-direction perpendicular to the drawing plane of FIG. 1. The first nozzle 1 is thus also called the upper nozzle 1 and the second nozzle is also called the lower nozzle 2. The distance V of the upper nozzle 1 from the lower nozzle 2 in the vertical direction y is selected depending on the vertical extension of the vehicle part to be cleaned 6.

The vehicle part 6 is in particular the rim 7 of a vehicle. In the same way, however, it can also be a sill or any other vehicle part 6. The vehicle part extends in particular perpendicular to the x-direction.

In the following, it is assumed that the vehicle part 6 is to be sprayed with cleaning liquid. In the same way, however, it is also possible that not the vehicle part as a whole but only a specific surface area of the vehicle part is to be sprayed with cleaning liquid. In this case, the area to be sprayed corresponds in size and orientation to the vehicle part 6 as shown in FIG. 1.

In FIG. 1 a vertical cross-section along the x-y plane is shown, which intersects the outlet openings of nozzles 1 and 2. In this cross-section along the x-y plane, starting from the upper nozzle 1 or the outlet opening of the upper nozzle 1, the first spray geometry 1-3 is delimited by a first upper side piece 1-1 and a first lower side piece 1-2. Here, the two side pieces 1-1 and 1-2 enclose the first opening angle $\alpha 1$ with one another in the x-y plane. Depending on the type of nozzle, cleaning liquid can optionally be discharged not only substantially along the x-y plane, but also additionally in other directions.

The area sprayed by the nozzles 1 and 2 in a y-z plane is rectangular in the case of a flat jet nozzle. In other types of nozzles, however, this area may also have a circular or elliptical circumference.

In the exemplary embodiment of the device, the first upper side piece 1-1 is horizontally orientated, i.e. in the x-direction. The first lower side piece 1-2 encloses an angle of 41 degrees with the first upper side piece 1-1 in the x-y plane at the outlet opening of the upper nozzle 1, so that this first lower side piece 1-2 is orientated diagonally downwards in the x-y plane.

If a vehicle part to be cleaned 6, whose surface to be cleaned runs in the vertical section along the x-y plane along the y-direction, is located at a horizontal distance in the x-direction at a horizontal distance H3 from the outlet opening of the upper nozzle 1, cleaning liquid discharged via the upper nozzle 1 is applied to this vehicle part 6. This area extends from the point of intersection d of the first upper side piece 1-1 with the vehicle part 6 down to the point of intersection b of the first lower side piece 1-2 with the vehicle part 6. In the vertical y-direction, the length of this area to which cleaning liquid is applied is thus $H3*\tan(\alpha 1)$. The length of the area of the vehicle part 6 to which cleaning liquid is applied in the vertical y-direction thus depends on the horizontal distance H3 in the x-direction of the vehicle part 6 from the outlet opening of the upper nozzle 1.

The lower nozzle 2 discharges cleaning liquid with a second spray geometry 2-3. The second spray geometry 2-3 is delimited in the vertical cross-section along the x-y plane starting from the lower nozzle 2 or the outlet opening of the lower nozzle 2 by a second upper side piece 2-1 and a second lower side piece 2-2. Here, the side pieces 2-1 and 2-2 enclose an opening angle $\alpha 2$ with one another. Within this angle $\alpha 2$, cleaning liquid is discharged in the x-y plane. Depending on the type of nozzle, cleaning liquid may also be discharged in other directions too.

In the exemplary embodiment shown in FIG. 1, the second lower side piece 2-2 is horizontally orientated in the x-direction in the vertical x-y plane. The second upper side piece 2-1 encloses the angle $\alpha 2$ with the second lower side piece 2-2, wherein it runs diagonally upwards from the outlet opening of the lower nozzle 2 in the x-y plane, so that it intersects the first lower side piece 1-2 at the point of intersection g before it comes into contact with the vehicle part 6. The opening angles $\alpha 1$ and $\alpha 2$ are thus selected depending on the horizontal distance H3 in the x-direction of the vehicle part from the outlet openings of nozzles 1 and 2 in such a way that this point of intersection is located in front of the vehicle part 6 in the horizontal x-direction.

The area of the vehicle part 6 covered in cleaning liquid from the lower nozzle 2 in the vertical y-direction extends, in the vertical cross-section of the x-y plane below, from the point of intersection a of the horizontal second lower side piece 2-2 orientated in the x-direction with the vehicle part 6 upwards to the point of intersection c of the second upper side piece 2-1 with the vehicle part 6. The length of this area in the vertical y-direction is $H3*\tan(\alpha 2)$.

From the point of intersection a of the second lower side piece 2-2 with the vehicle part 6 to the point of intersection b of the first lower side piece 1-2 with the vehicle part 6, the vehicle part 6 is sprayed in the y-direction at the vertical cross-section along the x-y-plane only by cleaning liquid discharged via the lower nozzle 2. From the point of intersection b to the point of intersection c, at which the second upper side piece 2-1 intersects the vehicle part 6, the vehicle part is sprayed in the y-direction both by cleaning liquid discharged via the lower nozzle 2 and by cleaning liquid discharged via the upper nozzle 1. From the point of intersection c to the point of intersection d, at which the first upper side piece 1-1 intersects the vehicle part 6, the vehicle part 6 is sprayed 2 in the y-direction only by cleaning liquid discharged via the upper nozzle 1.

If the vehicle part 6 extends from the point of intersection a to the point of intersection d, or if only the area between the point of intersection a and the point of intersection d in the y-direction is to be sprayed with cleaning liquid, no cleaning liquid discharged via the nozzles 1 and 2 is sprayed past the vehicle part 6 or the area of the vehicle part to be cleaned 6. This area in which no cleaning liquid is sprayed past a vehicle part 6 extends to a horizontal distance H2 of the vehicle part 6 from the outlet openings of the nozzles 1 and 2 in the x-direction. This horizontal distance H2 extends to the point of intersection e of the first lower side piece 1-2 with the second lower side piece 2-2 or the point of intersection f of the second upper side piece 2-1 with the first upper side piece 1-2, depending on which of the points of intersection e or f in the horizontal x-direction is situated closer to the outlet openings of the nozzles 1 and 2. Only from a horizontal distance in the x-direction greater than the distance H2 is cleaning liquid sprayed past the vehicle part 6 either below or above.

On the other hand, the vehicle part 6 or the area between the points of intersection a and d in the y-direction of the vehicle part is completely covered with cleaning liquid, wherein a larger quantity comes into contact with the vehicle part 6 in the area between the points of intersection b and c, since in this area both cleaning liquid from the upper nozzle 1 and cleaning liquid from the lower nozzle 2 come into contact with the vehicle part 6. This complete covering of the vehicle part 6 takes place until the horizontal distance H1 in the x-direction of the vehicle part 6 from the outlet openings of the nozzles 1 and 2 is fallen short of. This horizontal distance H1 in the x-direction is the horizontal distance in the x-direction of the point of intersection g of the first lower side piece 1-2 with the second upper side piece 2-1 from the outlet openings of the nozzles 1 and 2

If the vehicle part 6 is moved closer to the nozzles 1 and 2 in the horizontal x-direction than the distance H1, an area in the middle results to which cleaning liquid is not applied. As a result, however, there is a tolerance range in the horizontal x-direction between the distances H1 and H2 in which a vehicle part 6 orientated perpendicular to the x-direction can be located which, on the one hand, is completely covered with cleaning liquid and, wherein, on the other hand, no cleaning liquid is sprayed past the vehicle part 6. If it can be ensured that the vehicle part 6 is located in this range in the x-direction, it is not necessary to change the distance of the vehicle part 6 from the outlet openings of the nozzles 1 and 2 in the x-direction in order to ensure, on the one hand, that the vehicle part 6 is completely covered with cleaning liquid and, on the other hand, to prevent cleaning liquid from being sprayed past the vehicle part 6.

In the exemplary embodiment shown in FIG. 1, the outlet openings of nozzles 1 and 2 are in the same position in the x-direction. In other exemplary embodiments it is possible that the outlet openings of the nozzles 1 and 2 are arranged offset to one another in the x-direction. For example, if the lower nozzle 2 is arranged closer to the vehicle part 6 in the x-direction, the positions of the points of intersection g and f change. In such a case, the opening angle $\alpha2$ can be adjusted in such a way that the point of intersection f in the x-direction is located at the same position as the point of intersection e. In this case, the position of the point of intersection g moves in the x-direction. However, an area is still formed in the horizontal x-direction in which the vehicle part 6 can be positioned without cleaning liquid being sprayed past, wherein at the same time the vehicle part 6 is completely covered with cleaning liquid.

In further exemplary embodiments, the outlet opening of the one nozzle can alternatively or additionally be arranged in the z-direction, i.e. perpendicular to the plane of a vertical cross-section shown in FIG. 1, offset to the outlet opening of the other nozzle. In this case, the vertical cross-sections in the x-y plane through the outlet openings of the upper nozzle 1 or the lower nozzle 2 do not coincide. This results in a first vertical cross-section through the outlet opening of the upper nozzle 1 and a second vertical cross-section through the lower nozzle 2. These cross-sections are parallel to one another. In this case, spray geometries 1-3 and 2-3 would not intersect, as the cross-sections under consideration are parallel to and spaced apart from one another. However, if in this case a vertical projection along the z-direction onto an x-y-plane is considered, the representation reproduced in FIG. 1 results again, in which case the side pieces of the spray geometries 1-3 and 2-3 intersect, so that in this case the above information applies to such a vertical projection.

The pressure applied to the nozzles 1 and 2 on the part of the supply lines 4 and 5 is so great that a liquid volume discharged from the upper nozzle 1 at the outlet opening moves approximately on a straight line along the first upper side piece 1-1, the first lower side piece 1-2 or any other straight line in the range of the opening angle $\alpha1$ to the vehicle part 6. The downward deflection due to gravity is negligible here. Similarly, a liquid volume discharged from the lower nozzle 2 at the outlet opening moves approximately on a straight line along the second upper side piece 2-1, the second lower side piece 2-2 or any other straight line in the range of the opening angle $\alpha2$ in the direction of the vehicle part 6. Also in this case, a lowering of the liquid volume downwards due to gravity is negligible.

In further exemplary embodiments, it is possible that the first upper side piece 1-1 extends parallel to the second lower side piece 2-2, but the two side pieces 1-1 and 2-2 are not horizontally orientated in the x-direction, rather they enclose an angle with the x-direction. Such an orientation of the side pieces 1-1 and 2-2 is selected in particular when the surface of the vehicle part to be cleaned 6 does not extend perpendicular to the x-direction, i.e. runs in the y-direction in the cross-section shown in FIG. 1, but rather encloses an angle with the y-direction. In this case, the angle that the side pieces 1-1 and 2-2 enclose with the x-direction is selected in particular so that the side pieces 1-1 and 2-2 come into perpendicular contact with the vehicle part 6 or the surface of the vehicle part to be cleaned 6. Also in this case, in a direction which includes the same angle with the x-direction as the side pieces 1-1 and 2-2, a tolerance range then results for the vehicle part 6 in this direction, in which the vehicle part 6 is completely sprayed, but no cleaning liquid is sprayed past the vehicle part 6.

In even further exemplary embodiments, the first upper side piece 1-1 does not extend exactly parallel to the second lower side piece 2-2. In this case, in the cross-section shown in FIG. 1 in the x-y plane or in the vertical projection on such a plane described above, an angle between a first straight line G1 running through the first upper side piece 1-1 with a second straight line G2 running through the second lower side piece 2-2 results. The point of intersection of the straight lines G1 and G2 at which this angle is formed can be either in the discharge direction of the cleaning liquid or against the discharge direction of the cleaning liquid. According to the invention, this angle is smaller than 10 degrees, in particular smaller than 5 degrees, preferably smaller than 3 degrees. With such small angles, a tolerance range in the horizontal x-direction no longer results, in which no cleaning liquid is sprayed past the vehicle part 6, and at the same time the vehicle part 6 is completely covered with liquid, regardless of the horizontal distance in the x-direction of the vehicle part 6 from the nozzles 1 and 2, however at least one area in the x-direction results, in which only a little cleaning liquid is sprayed past the vehicle part 6 or a very small area is not completely covered with cleaning liquid.

In a further exemplary embodiment, the second lower side piece 2-2 is horizontally orientated, i.e. parallel to the x-direction, however the first upper side piece 1-1 is inclined downwards in the x-y plane, i.e. it encloses an angle with the x-direction. This angle is in a range of 6 degrees to 8 degrees, in particular this angle is 8 degrees.

This exemplary embodiment is particularly advantageous if the device is used in a vehicle washing installation in which vehicles with different rim sizes or wheel sizes are cleaned. Due to the horizontal orientation of the second lower side piece 2-2, this side piece 2-2 approximately always intersects the lower edge of the vehicle rim 7, regardless of the wheel size, provided that the lower nozzle 2 is arranged at the height of this lower edge and it is approximately assumed that this lower edge is always approximately the same distance from the ground, regardless of the wheel size or rim size. The first upper side piece 1-1, on the other hand, comes into contact with the vehicle wheel or rim 7 in a vertical position that depends on the horizontal distance of the vehicle wheel from the nozzles 1 and 2. This horizontal distance of the vehicle rim 7 from the nozzles is, however, usually smaller for vehicles with a large track width than for vehicles with a smaller track width. At the same time, vehicles with a large track width usually have a larger rim diameter than vehicles with a smaller track width. This results in large vehicle rims 7 having a smaller horizontal distance from the nozzles than smaller vehicle rims 7 in a vehicle washing installation 7. Since the first upper side piece 1-1 now comes into contact with a horizontal vehicle rim arranged closer to the nozzles 1 and 2 further up, and comes into contact with a horizontal vehicle rim 7 arranged further away from the nozzles 1 and 2 further down, the inclination of the first upper side piece 1-1 in a vehicle washing installation balances the different positions and sizes of different vehicle rims 7 in such a way that the vehicle rims 7 can be substantially completely sprayed, regardless of their size, without cleaning liquid being sprayed past the vehicle rims 7.

If the surface of the vehicle part to be cleaned 6 does not extend perpendicular to the x-direction or perpendicular to the first upper side piece 1-1, but rather is a curved surface, the above explanations shall apply accordingly, wherein in this case certain changes may result with regard to the ideal horizontal distance range of the vehicle part 6.

In a further exemplary embodiment, the nozzles 1, 2 are arranged rotatably around an axis which extends in the x-direction and which intersects the point of intersection g. In this case, the first and second supply lines 4 and 5 are coupled to the nozzles 1 and 2 in such a way that such a rotation of the nozzles 1 and 2 is possible. In this case, a surface can be sprayed with cleaning liquid by means of the nozzles 1 and 2, which is circular disc-shaped in the y-z plane.

Figure 2:
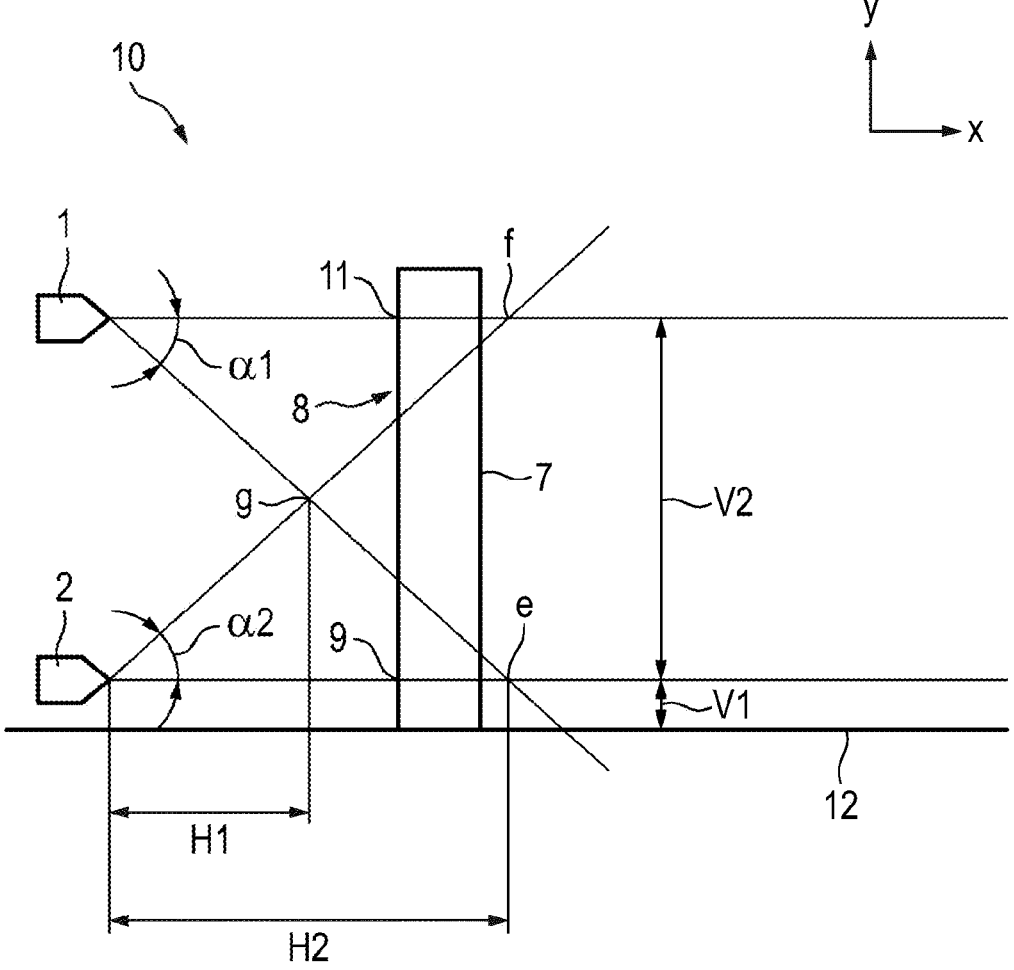
FIG. 2 shows an exemplary embodiment of a vehicle washing installation with the exemplary embodiment of the device according to the invention as a partial view in a vertical cross-section.

FIG. 2 shows a vehicle washing installation comprising the device 10 described above for applying a cleaning liquid. Here, only a section of the vehicle washing installation and only the upper nozzle 1 and the lower nozzle 2 of the device 10 are shown.

The vehicle washing installation may be a roll-over vehicle washing installation as known per se or a car wash. In this case, the device 10 is intended for spraying the outwardly facing surface 8 of a rim 7 of a vehicle with cleaning liquid. The surface 8 in the vehicle washing installation can subsequently be cleaned with a rim brush. Here, the nozzles 1 and 2 of the device 10 are arranged in the vertical y-direction in such a way that a rim 7 is cleaned whose lower edge 9 of the surface to be cleaned 8 is located at a distance V1 above a ground 12, and in which case there is a vertical distance V2 in the y-direction between the lower edge 9 and the upper edge 11 of the surface to be cleaned 8. The distance V1 here is, for example, 60 mm and the distance V2 is 520 mm, so that the upper edge 11 of the surface to be cleaned 8 is 580 mm above the ground 12.

In this case, in the vehicle washing installation, the upper nozzle 1 of the device 10 is arranged in the y-direction at a distance above the ground 12, which corresponds to the sum of the distances V1 and V2; the lower nozzle 2 is arranged in the y-direction at a distance above the ground 12, which corresponds to the distance V1. The opening angles $\alpha 1$ and $\alpha 2$ are selected in such a way that the horizontal distance in the x-direction of the point of intersection b from the position of the outlet openings of the nozzles 1 and 2 is H1, and the horizontal distance H2 of the point of intersection f, which is located closer in the x-direction to the nozzles 1 and 2 than the intersection point e, is H2. The horizontal distance H1 is, for example, 300 mm and the horizontal distance H2 is 650 mm. Thus a tolerance range between the distances H1 and H2 in the x-direction with the length of 350 mm results, in which the surface to be cleaned 8 of the rim 7 can be arranged without cleaning liquid being sprayed past this surface to be cleaned 8, wherein at the same time the surface to be cleaned 8 is completely covered with cleaning liquid from the nozzles 1 and 2.

In a further exemplary embodiment, the nozzles 1 and 2 may be arranged so as to be moveable in the vertical y-direction. Furthermore, in these exemplary embodiments, the diameter of the rim 7, i.e. the distance V2, and the size of the wheel of the vehicle can be detected so that the distance V1 can also be calculated. A sensor can be provided for this purpose, for example. Alternatively, the rim size and wheel size can also be transmitted to the vehicle washing installation as a data record. The position of the outlet openings of the nozzles 1 and 2 in the y-direction can then be moved in each case in such a way that the lower nozzle 2 is arranged at a height V1 and the upper nozzle is arranged at a height which results from the sum of the distances V1 and V2.

In the following, an exemplary embodiment of the method according to the invention for applying a cleaning liquid to a vehicle part 6 is described:

A device 10 is arranged as described above in a vehicle washing installation, for example a roll-over vehicle washing installation. The nozzles 1 and 2 are arranged here in the lower area of the gantry at the height of the vehicle part to be cleaned 6, in the present exemplary embodiment at the height of the vehicle rim 7, as described with reference to FIG. 2. The position of a rim 7 is detected by means of a sensor and the gantry is moved in the z-direction towards the rim 7 in such a way that the position of the axis of the rim 7 in the z-direction coincides with the position of the nozzles 1 and 2 in the z-direction.

Optionally, the wheel type and rim type of the vehicle to be cleaned are detected. From this, the distances V1 and V2 are determined. If the nozzles 1 and 2 can be moved in the vertical y-direction, they are positioned at the height in such a way as explained with reference to FIG. 2 and as shown in FIG. 2.

Cleaning liquid is subsequently discharged via the discharge openings of nozzles 1 and 2 in the direction of the surface to be cleaned 8 of the rim 7 with the first spray geometry 1-2 and the second spray geometry 2-3. The cleaning liquid is not only discharged in the x-y plane, but also in the positive and negative z-direction, so that the surface 8 to be cleaned of the rim 7 is completely sprayed with cleaning liquid. The surface to be cleaned 8 is located at a horizontal distance in the x-direction from the nozzles 1 and 2, which is situated between the distance H1 and the distance H2.

If the surface to be cleaned is not completely detected in the z-direction, the gantry is moved back and forth in the z-direction so that the entire surface to be cleaned 8 is sprayed with cleaning liquid.

If the upper and lower nozzles 1, 2 are arranged offset to one another in the z-direction, the nozzles 1, 2 are controlled in such a way that cleaning liquid is discharged via the nozzles 1, 2 with a time delay. The cleaning liquid is discharged in each case at a time at which the position of the rim axis in the z-direction corresponds to the position of the respective nozzle 1, 2. In order to be able to control the nozzles 1, 2 with a time delay, in this case electronically controllable valves are arranged in the first and second supply line 4, 5, which are coupled with a control device, which in turn is coupled with the sensor for detecting the position of the vehicle in the z-direction.

If, on the other hand and as described above, the nozzles 1, 2 are arranged rotatably around an axis which extends in the x-direction and which intersects the point of intersection g, the circular disc-shaped rim 7 can be completely covered with cleaning liquid when the rim axis is located in the z-direction at the position of the two nozzles 1 and 2 in the z-direction.

LIST OF REFERENCE NUMERALS

1 First nozzle
1-1 First upper side piece
1-2 First lower side piece
1-3 First spray geometry
2 Second nozzle
2-1 Second upper side piece
2-2 First lower side piece
2-3 Second spray geometry
3 Central supply line
4 First supply line
5 Second supply line
6 Vehicle part
7 Rim
8 Surface to be cleaned of rim 7
9 Lower edge
10 Device
11 Upper edge
12 Ground

The invention claimed is:

1. A device for applying a cleaning liquid to a vehicle wheel or to a wheel rim, the device consisting of:
   an upper nozzle configured for discharging cleaning liquid in a first spray geometry, the first spray geometry delimited in a first vertical cross-section starting from the upper nozzle, by a first upper side piece and a first lower side piece that enclose a first opening angle with one another, and
   a lower nozzle configured for discharging cleaning liquid in a second spray geometry, the second spray geometry delimited in a second vertical cross-section starting from the lower nozzle, by a second upper side piece and a second lower side piece that enclose a second opening angle with one another,
   wherein the upper nozzle is arranged in a vertical direction at a distance above the lower nozzle,
   wherein in a vertical projection, a first straight line extending through the first upper side piece encloses an angle with a second straight line extending through the second lower side piece that is less than 10 degrees, and the first lower side piece intersects the second upper side piece in a discharge direction of the cleaning liquid,
   wherein a vertical distance of the upper nozzle from the lower nozzle corresponds to a diameter of at least one vehicle wheel or wheel rim to which the cleaning fluid is to be applied and a distance of the upper nozzle from a ground surface corresponds to a distance of an upper edge of the at least one vehicle wheel or wheel rim from the ground surface, and a distance of the lower nozzle from the ground surface corresponds to a distance of a lower edge of the at least one vehicle wheel or wheel rim from the ground surface,
   wherein at least one of the first upper side piece and the second lower side piece is horizontally oriented,
   wherein the upper and lower nozzles are configured to move together with the device in a vehicle washing installation in which the device is contained, and
   wherein the upper and lower nozzles do not pivot or rotate.

2. The device of claim 1, wherein the first vertical cross-section and the second vertical cross-section coincide.

3. The device of claim 1, wherein the first vertical cross-section is arranged at a distance from the second vertical cross-section and the upper nozzle is arranged in at least one of a vertical direction and a horizontal direction at a distance from the lower nozzle.

4. The device of claim 1, wherein the first upper side piece and the second lower side piece are oriented parallel to one another.

5. The device of claim 1, wherein at least one of the first opening angle and the second opening angle is in a range of 30 degrees to 50 degrees.

6. The device of claim 1, wherein the second lower side piece is horizontally oriented, and the first upper side piece is inclined downwards by an angle in a range of 6 degrees to 10 degrees.

7. The device of claim 1, wherein at least one of the upper nozzle and the lower nozzle is at least one of a full-cone nozzle and a flat jet nozzle.

8. The device of claim 1, wherein a composite spray geometry of the first and second vertical cross-sections, which is composed of the first spray geometry and the second spray geometry, is mirror symmetrical.

9. A vehicle washing installation comprising the device of claim 1.

10. A method for applying a cleaning liquid to a vehicle wheel or a wheel rim to be cleaned, the method comprising:

discharging a cleaning liquid from an upper nozzle of the device of claim 1 in a first spray geometry in a direction of the vehicle wheel or wheel rim to be cleaned, wherein the first spray geometry is delimited in a first vertical cross-section starting from the upper nozzle, by a first upper side piece and a first lower side piece that enclose a first opening angle with one another, and discharging a cleaning liquid from a lower nozzle of the device of claim 1 vertically spaced from the upper nozzle in a second spray geometry in the direction of the vehicle wheel or wheel rim to be cleaned, wherein the second spray geometry is delimited in a second vertical cross-section starting from the lower nozzle, by a second upper side piece and a second lower side piece that enclose a second opening angle with one another, wherein in a vertical projection, a first straight line extending through the first upper side piece encloses an angle with a second straight line extending through the second lower side piece that is less than 10 degrees, and the first lower side piece intersects the second upper side piece in a discharge direction of the cleaning liquid, wherein a vertical distance of the upper nozzle from the lower nozzle corresponds to a diameter of at least one vehicle wheel or wheel rim to be cleaned and a distance of the upper nozzle from a ground surface corresponds to a distance of an upper edge of the at least one vehicle wheel or wheel rim from the ground surface, and a distance of the lower nozzle from the ground surface corresponds to a distance of a lower edge of the at least one vehicle wheel or wheel rim from the ground surface, wherein at least one of the first upper side piece and the second lower side piece is horizontally oriented, wherein the upper and lower nozzles are configured to move together with the device of claim 1 in a vehicle washing installation in which the device of claim 1 is contained, and wherein the upper and lower nozzles do not pivot or rotate.

11. The method of claim 10, further comprising:

determining a vertical position of at least one of an upper edge of the vehicle wheel or wheel rim to be cleaned and a lower edge of the vehicle wheel or wheel rim to be cleaned, and prior to operation of the vehicle washing installation, adjusting at least one of the vertical position of the upper nozzle to correspond to the vertical position of the upper edge of the vehicle wheel or wheel rim to be cleaned and the vertical position of the lower nozzle to correspond to the vertical position of the lower edge of the vehicle wheel or wheel rim to be cleaned.

12. The method of claim 11, wherein the first lower side piece contacts the vehicle wheel or wheel rim to be cleaned above the lower edge of the vehicle wheel or wheel rim to be cleaned.

13. The method of claim 11, wherein the second upper side piece contacts the vehicle wheel or wheel rim to be cleaned below the upper edge of the vehicle wheel or wheel rim to be cleaned.

* * * * *